United States Patent Office 3,850,942
Patented Nov. 26, 1974

3,850,942
3-PYRIDYL-9H-DIBENZO[c,f]-s-TRIAZOLO [4,3-a]AZEPINE
Jackson B. Hester, Jr., Galesburg, and Jacob Szmuszkovicz, Kalamazoo, Mich., assignors to The Upjohn Company, Kalamazoo, Mich.
No Drawing. Continuation-in-part of abandoned application Ser. No. 227,916, Feb. 22, 1972. This application Dec. 8, 1972, Ser. No. 313,208
Int. Cl. C07d 31/42
U.S. Cl. 260—296 P                                3 Claims

ABSTRACT OF THE DISCLOSURE

Compounds of the formula III:

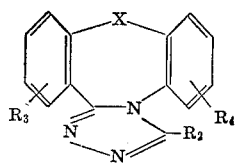

III wherein X is selected from the group consisting of oxygen, sulfur,

in which $R_5$ and $R_6$ are each selected from the group consisting of hydrogen and alkyl of 1 to 3 carbon atoms, inclusive, and $>N—R_1$ in which $R_1$ is selected from the group consisting of hydrogen, alkyl defined as above,

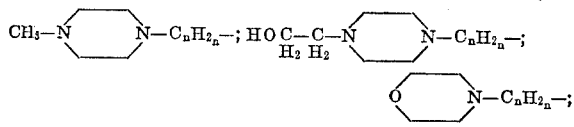

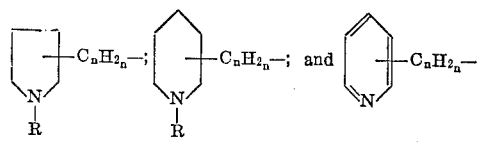

in which $n$ is 1 to 4, inclusive, and R is hydrogen or alkyl defined as above, or $R_1$ is

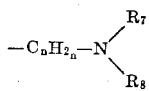

or

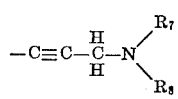

in which $R_7$ and $R_8$ are each selected from the group consisting of hydrogen and alkyl as defined above or

together is pyrrolidino, or piperidino wherein $R_2$ is selected from the group consisting of hydrogen, alkyl, hydroxymethyl defined as above,

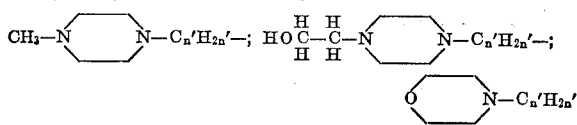

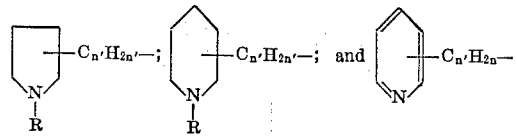

in which $n'$ is 0 to 4, inclusive, and R is hydrogen or alkyl defined as above or $R_2$ is

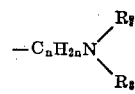

or

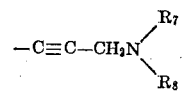
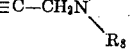

in which $n'$ is defined as above, and $R_7$ and $R_8$ are each selected from the group consisting of hydrogen and alkyl as defined above, or

together is pyrrolidino, or piperidino; wherein $R_3$ and $R_4$ are selected from the group consisting of hydrogen, fluoro, chloro, bromo, iodo, amino, nitro, cyano, alkyl, defined as above, trifluoromethyl, and alkoxy, alkylthio, alkylsulfinyl, alkylsulfonyl, and alkanoylamino, in which the carbon moiety is of 1 to 3 carbon atoms, inclusive, and dialkylamino in which alkyl is defined as above, are prepared by reacting a thio compound of formula I

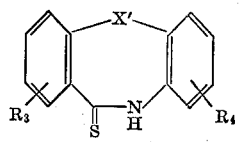

I wherein X' is oxygen, sulfur,

in which $R_5$ and $R_6$ are defined as above, and $>NH$; wherein $R_3$ and $R_4$ are defined as above, with a selected carboxylic acid hydrazide or, in two steps, with hydrazine and then a carboxylic acid halide or anhydride. The resulting products II can be further modified to yield the other compounds corresponding to formula II, as defined above.

Compounds of formula III and the pharmacologically acceptable acid addition salts and N-oxides thereof have central nervous antidepressant activity and can be used in mammals and birds.

CROSS REFERENCE TO RELATED APPLICATION

This application is a continuation-in-part of application Ser. No. 227,916 filed Feb. 22, 1972, now abandoned.

BACKGROUND OF THE INVENTION

Field of the invention

This invention is directed to new organic compounds and is particularly concerned with novel compounds of formulae II and III and processes for the production thereof.

The novel compounds and the process of production therefor can be illustratively represented as follows:

[Structure I: dibenzo-fused 7-membered ring with X bridge, R₃, R₄ substituents, and C(=S)NH group]

↓

[Structure II and Structure III: triazole/imidazole-fused analogs with R₂, R₃, R₄ substituents]

wherein X is selected from the group consisting of oxygen, sulfur, $$\diagdown C \diagup \begin{matrix} R_5 \\ R_6 \end{matrix}$$

in which $R_5$ and $R_6$ are each selected from the group consisting of hydrogen and alkyl of 1 to 3 carbon atoms, inclusive, and >N—$R_1$ in which $R_1$ is selected from the group consisting of hydrogen, alkyl defined as above,

[Structures: CH₃—N(piperazine)N—C_nH_{2n}—;  HOC(H₂)—C(H₂)—N(piperazine)N—C_nH_{2n}—;  O(morpholine)N—C_nH_{2n}—;  pyrrolidine-C_nH_{2n}—;  piperidine-C_nH_{2n}—; and pyridine-C_nH_{2n}—]

in which $n$ is 1 to 4, inclusive, and R is hydrogen and alkyl defined as above, or $R_1$ is $$-C_nH_{2n}-N\diagup^{R_7}_{R_8}$$

and $$-C{\equiv}C-\overset{H}{\underset{H}{C}}-N\diagup^{R_7}_{R_8}$$

in which $R_7$ and $R_8$ are each selected from the group consisting of hydrogen and alkyl as defined above or $$-N\diagup^{R_7}_{R_8}$$

together is pyrrolidino or piperidino, wherein X' is selected from the group consisting of oxygen, sulfur, $$\diagdown C \diagup \begin{matrix} R_5 \\ R_6 \end{matrix}$$

in which $R_5$ and $R_6$ are defined as above and >NH; wherein $R_2$ is selected from the group consisting of hydrogen, hydroxymethyl, alkyl defined as above,

[Structures: CH₃—N(piperazine)N—C_{n'}H_{2n'}—;  HOC(H)—C(H)—N(piperazine)N—C_{n'}H_{2n'}—;  O(morpholine)N—C_{n'}H_{2n'}—; pyrrolidine—C_{n'}H_{2n'}—; piperidine—C_{n'}H_{2n'}—; pyridine—C_{n'}H_{2n'}—]

and

[piperidine—C_{n'}H_{2n'}—]

in which $n'$ is 0 to 4, inclusive, and R is hydrogen and alkyl defined as above, or $R_2$ is $$-C_{n'}H_{2n'}-N\diagup^{R_7}_{R_8} \quad \text{or} \quad -C{\equiv}C-\overset{H}{\underset{H}{C}}\diagup^{R_7}_{R_8}$$

in which $n'$ is defined as above, and $R_7$ and $R_8$ are each selected from the group consisting of hydrogen and alkyl as defined above, or $$-N\diagup^{R_7}_{R_8}$$

together is pyrrolidino, or piperidino, wherein $R_3$ and $R_4$ are selected from the group consisting of hydrogen, fluoro, chloro, bromo, iodo, amino, nitro, cyano, alkyl defined as above, trifluoromethyl, and alkoxy, alkylthio, alkylsulfinyl, alkylsulfonyl, and alkanoylamino, in which the carbon moiety is of 1 to 3 carbon atoms, inclusive, and dialkylamino in which alkyl is defined as above.

If $R_2$ of compound II hydrogen, other $R_2$ substituents are obtained by e.g. halogenation and then reacting the halo compounds with ammonia, substituted amines, cyanides and the like by conventional procedures. Additional methods can be employed to obtain other compounds embraced by this invention and corresponding to formula III:

[Structure III]

wherein X is selected from the group consisting of oxygen, sulfur, $$\diagdown C \diagup \begin{matrix} R_5 \\ R_6 \end{matrix}$$

in which $R_5$ and $R_6$ are each selected from the group consisting of hydrogen and alkyl of 1 to 3 carbon atoms, inclussive; and >N—$R_1$ in which $R_1$ is selected from the group consisting of hydrogen, alkyl defined as above,

[Structures: H₃C—N(piperazine)N—C_nH_{2n}—; HOC(H)—C(H)—N(piperazine)N—C_nH_{2n}—; O(morpholine)N—C_nH_{2n}—; pyrrolidine—C_nH_{2n}—; piperidine—C_nH_{2n}—; and pyridine—C_nH_{2n}—]

in which $n$ is 1 to 4, inclusive, and R is hydrogen and alkyl defined as above, or $R_1$ is $$-C_nH_{2n}-N\diagup^{R_7}_{R_8} \quad \text{and} \quad -C{\equiv}C-\overset{H}{\underset{H}{C}}-C\diagup^{R_7}_{R_8}$$

in which $R_7$ and $R_8$ are each selected from the group consisting of hydrogen and alkyl as defined above or

together is pyrrolidino or piperidino; wherein $R_2$ is selected from the group consisting of hydrogen, alkyl hydroxymethyl defined as above,

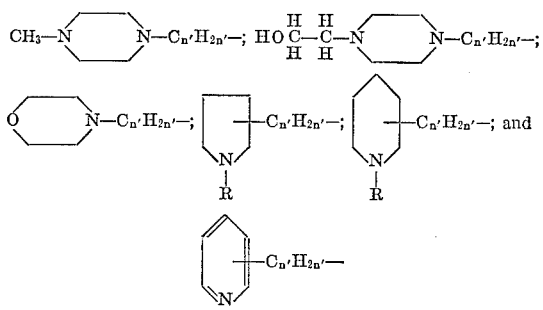

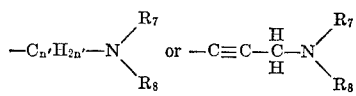

in which $n'$ is 0 to 4, inclusive, and R is hydrogen and alkyl defined as above, or $R_2$ is

in which $n'$ is defined as above and $R_7$ and $R_8$ are each selected from the group consisting of hydrogen and alkyl as defined above or

together is pyrrolidino or piperidino; wherein $R_3$ and $R_4$ are selected from the group consisting of hydrogen, fluoro, chloro, bromo, iodo, amino, nitro, cyano, alkyl defined as above, trifluoromethyl, and alkoxy, alkylthio, alkylsulfinyl, alkylsulfonyl, and alkanoylamino, in which the carbon moiety is of 1 to 3 carbon atoms, inclusive, and dialkylamino in which alkyl is defined as above.

The preferred compounds of this invention are those wherein X is selected from the group consisting of oxygen, sulfur,

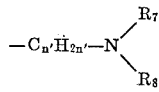

in which $R_5$ and $R_6$ are selected from the group consisting of hydrogen, alkyl of 1 to 3 carbon atoms, inclusive, and $>N-R_1$ in which $R_1$ is selected from the group consisting of hydrogen alkyl, defined as above,

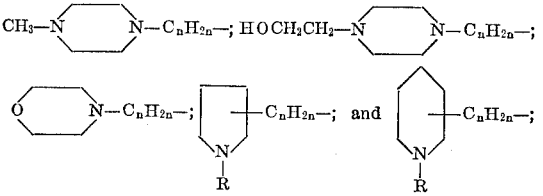

in which $n$ is 1 to 4, inclusive, and R is hydrogen and alkyl defined as above, or $R_1$ is

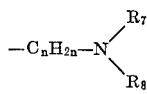

in which $R_7$ and $R_8$ are selected from the group consisting of hydrogen and alkyl as defined above, or

together is pyrrolidino or piperidino; wherein $R_2$ is selected from the group consisting of hydrogen, alkyl, as defined above, hydroxymethyl,

in which $n'$ is 0 to 4 inclusive, and $R_7$ and $R_8$ are each selected from the group consisting of hydrogen and alkyl as defined above, or

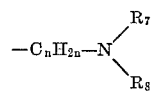

together is pyrrolidino or piperidino; wherein $R_3$ and $R_4$ are selected from the group consisting of hydrogen, fluoro, bromo, chloro, nitro, cyano, alkyl defined as above, trifluoromethyl, and alkylthio, in which the carbon moiety is of 1 to 3 carbon atoms, inclusive.

The most desirable compounds of formula III are those wherein X is selected from the group consisting of oxygen, sulfur, $>CH_2$ and $>NR_1$ in which $R_1$ is selected from the group consisting of hydrogen, methyl, ethyl,

in which $n$ is 1 to 3, inclusive, and $R_7$ and $R_8$ are each selected from the group consisting of hydrogen, methyl or ethyl, or

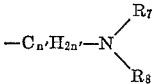

together is pyrrolidino; wherein $R_2$ is selected from the group consisting of hydrogen, methyl, ethyl, hydroxymethyl,

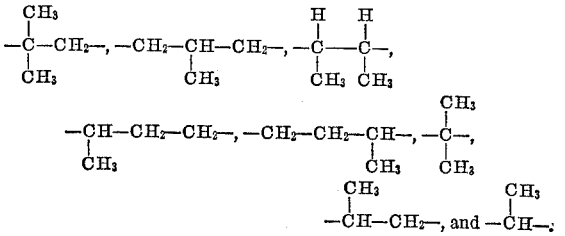

in which $n'$ is 0 to 3, inclusive and $R_7$ and $R_8$ are each selected from the group consisting of hydrogen, methyl and ethyl; wherein $R_3$ and $R_4$ are selected from the group consisting of hydrogen, fluoro, chloro, nitro, trifluoromethyl, and alkylthio in which alkyl is defined as above.

The invention also embraces the pharmacologically acceptable acid addition salts and N-oxides of the compounds of formula III above.

The process of this invention comprises: heating a thio compound of formula I with a selected carboxylic acid halide or anhydride to obtain the triazole compound II and, if desired, to subject compound II to conventional processes to obtain compounds of formula III.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, alkylsulfinyl, alkylsulfonyl, and alkylthio, which is of 1 to 3 carbon atoms, inclusive, can be defined as lower-alkyl of 1 to 3 carbon atoms, inclusive, above.

The group $C_nH_{2n}$ wherein $n$ is 1 to 4 comprises $-CH_2-$, $-(CH_2)_2-$, $-(CH_2)_3-$, $-(CH_2)_4-$, and branched alkylene such as $$-\underset{\underset{CH_3}{|}}{\overset{\overset{CH_3}{|}}{C}}-CH_2-,\ -CH_2-\underset{\underset{CH_3}{|}}{CH}-CH_2-,\ -\underset{\underset{CH_3}{|}}{\overset{\overset{H}{|}}{C}}-\underset{\underset{CH_3}{|}}{\overset{\overset{H}{|}}{C}}-,$$

$$-\underset{\underset{CH_3}{|}}{CH}-CH_2-CH_2-,\ -CH_2-CH_2-\underset{\underset{CH_3}{|}}{CH}-,\ -\underset{\underset{CH_3}{|}}{\overset{\overset{CH_3}{|}}{C}}-,$$

$$-\underset{\underset{CH_3}{|}}{CH}-CH_2-,\ \text{and}\ -\underset{\underset{CH_3}{|}}{CH}-:$$

The alkanoylamino group of 1 to 3 carbon atoms consists of formamido

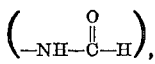

acetamido and propionamido.

The compounds of formula III and the pharmacologically acceptable acid addition salts are useful central nervous system agents for the control of depression and anxiety in mammals and birds.

For the control of depression the compounds of formula III and the pharmacologically acceptable acid addition salts can be used in dosages of 0.1 to 5.0 mg./kg. in oral or injectable preparations to alleviate depression occurring in stressful situations in the same manner as imipramine, amitriptylene and other antidepressants. Such situations are those, for example, when animals are changing ownership or are temporarily put into kennels while their owners are absent from home.

For the control of anxiety the compounds of formula III and the pharmacologically acceptable acid addition salts can be used in dosages of 0.01 to 10 mg./kg. in oral and injectable preparations to alleviate tension and anxiety in mammals or birds in the same way as doxepine and other antianxiety agents. Such stressful situations arise, for example, when animals are in travel.

Acid addition salts of the compounds of formula III can be made, such as the fluosilicic acid addition salts which can be applied as mothproofing agents, and salts with trichloroacetic acid, useful as herbicides against Johnson grass, Bermuda grass, yellow and red foxtail, and quack grass.

The pharmaceutical forms of compounds of formula III and salts thereof contemplated by this invention include pharmaceutical compositions suited for oral, parenteral, and rectal use, e.g., tablets, powder packets, cachets, dragées, capsules, solutions, suspension, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil, and peanut oil, may be used for preparing solutions or suspensions of the active drug. Sweetening, coloring, and flavoring agents may be added.

For mammals food premixes with starch, oatmeal, dried fishmeat, fishmeal, flour, and the like can be prepared.

The starting materials of this invention dihydrodibenzoazepinethiones I are either known or can be synthesized by known procedures e.g. by refluxng the corresponding amides with phosphorus pentasulfide, as further illustrated in the Preparations.

In carrying out the process of this invention, a selected thione I, is heated with a carboxylic acid hydrazide to about 200° for a period of 30 minutes to 4 hours. Product II which is thus obtained, is isolated and purified by conventional means, e.g. extraction, filtration, chromatography or crystallization.

Alternatively the thione-starting material I can be treated with hydrazine or hydrazine hydrate at temperatures between 25–100° C. with or without a solvent such as ethanol or other alkanol, ether, tetrahydrofuran, benzene or the like for 1 to 4 hours to give the corresponding intermediate IV:

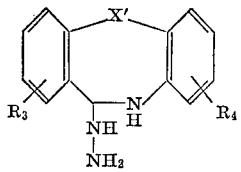

wherein X', $R_3$, $R_5$ are defined as above, compound IV can be condensed with an acid halide of the formula

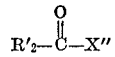

wherein $R'_2$ is defined as $R_2$ herein above, when $n'$ is only 1–4, and X" is bromine or chlorine to give the corresponding compound of formula II.

If ethyl orthoformate is used, a 3-unsubstituted 9H-dibenzo[c,f] - s - triazolo[4,3 - a]azepine, -diazepine, -oxazepine or -thiazepine is obtained which can be brominated and the resulting bromo compound can be used as intermediate for additional 3-substituted compounds of formula III as shown in the Examples.

The following preparations and examples are illustrative of the processes and products of the present invention, but are not to be construed as limiting.

*Preparation 1.*—6(5H)-morphanthridinethione

A mixture of 6(5H)-morphanthridinethione (30 g., 0.144 mole), phosphorus pentasulfide (33.5 g. 0.158 mole) and 1200 ml. of pyridine was heated at reflux temperature for 23 hours and the pyridine was then evaporated. Methylene chloride and water were added, and the organic layer was separated (some solid was present), washed with aqueous sodium bicarbonate until only a trace of solid was present, then with saturated salt solution, dried over anhydrous magnesium sulfate and evaporated. Trituration of the residue with methanol gave 28.8 g. of 6(5H)-morphanthridinethione of melting point 218–219° C. Crystallization from methylene chloride-methanol gave the product as pale yellow rods; the melting point was unchanged.

*Anal.*

Calcd. for $C_{14}H_{11}N_2$: C, 74.63; H, 4.92; N, 6.22; S, 14.23.

Found: C, 74.94; H, 5.07; N, 6.08; S, 14.25.

*Preparation 2.*—5,10-Dihydro-11H-dibenzo[b,e][1,4] diazepine-11-thione

A mixture of 5,10-dihydro-11H-dibenzo[b,e][1,4]diazepin-11-one (10 g., 0.0476 mole), phosphorus pentasulfide (9.3 g., 0.0525 mole) and 365 ml. of pyridine was heated at reflux temperature for 3 hours and allowed to stand overnight. The pyridine was evaporated, and the residue was shaken with 250 ml. each of water and chloroform. The resulting suspension was filtered to remove solid product. After filtration the chloroform layer was separated from the aqueous layer, washed with water and saturated salt solution, dried over anhydrous magnesium sulfate and evaporated. The residue was combined with the solid obtained above and crystallized from methanol. Two crops of 5,10-dihydro-11H-dibenzo[b,e][1,4]diazepin-11-thione were obtained; yield, 9.01 g. (84% of theory), melting point 257–259° C.

*Preparation 3.*—Dibenzo[b,f][1,4]oxazepine-11(10H)-thione

A mixture of dibenz[b,f][1,4]oxazepin-11(10H)-one (21.6 g., 0.1 mole), phosphorus pentasulfide (23.4 g., 0.105 mole) and 850 ml. of pyridine was heated at reflux temperature for 4 hours and the pyridine was evaporated in vacuo. The residue was stirred with chloroform, and 500 ml. of saturated aqueous sodium bicarbonate solution was added. The resulting suspension was filtered and the solid was discarded. The filtrate was separated into layers, and the organic layer was washed successively with aqueous sodium bicarbonate and with saturated salt solution, dried over anhydrous magnesium sulfate and evaporated. The residue was crystallized from chloroform-methanol; 14.6 g. of dibenzo[b,f][1,4]oxazepine-11(10H)-thione was obtained as pale yellow needles which melted at 194–195° C. Recrystallization did not alter the melting point.

*Anal.*

Calcd. for $C_{13}H_9NOS$: C, 68.69; H, 3.99; N, 6.16; S, 14.11.

Found: C, 68.50; H, 3.93; N, 6.30; S, 13.77.

*Preparation 4.*—Dibenzo[b,f][1,4]thiazepine-11(10H)-thione

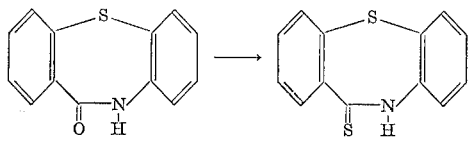

A mixture of dibenzo[b,f][1,4]thiazepin-11(10H)-one and phosphorus pentasulfide in pyridine was heated at reflux for 6 hours. The pyridine was heated at reflux for 6 hours. The pyridine was evaporated in vacuo and the residue was processed as in Preparation 2 to give dibenzo-[b,f][1,4]thiazepine-11(10H)-thione; melting point 246–247.5° C.

*Preparation 5.*—7-Chloro-5,10-dihydro-11H-dibenzo-[b,e][1,4]diazepine-11-thione A mixture of 7-chloro-5,10-dihydro-11H-dibenzo[b,e][1,4]diazepin-11-one (30.5 g., 0.125 mole), phosphorus pentasulfide (27.8 g., 0.131 mole) and one l. of pyridine was heated at reflux temperature for 4 hours and the pyridine was evaporated in vacuo. The residue was stirred for 1 hour with one l. each of saturated aqueous sodium bicarbonate and methylene chloride and filtered to remove some solid product. The organic layer of the filtrate was washed successively with sodium bicarbonate solution and with saturated salt solution, dried over anhydrous magnesium sulfate and evaporated. The residue was combined with the solid obtained above and triturated with hot chloroform and methanol; 12.2 g. of 7-chloro-5,10-dihydro-11H-dibenzo[b,e][1,4]diazepine-11-thione was obtained of melting point 274–275° C. Concentration of the chloroform-methanol washings afforded an additional 8.4 g. of product having the same melting point. Recrystallization from dimethylformamide-water gave an analytical sample in the form of pale yellow needles of melting point 276–277° C.

*Preparation 6.*—5,10-Dihydro-5-methyl-11H-dibenzo-[b,e][1,4]diazepine-11-thione A mixture of 5,10-dihydro-5-methyl-11H-dibenzo[b,e][1,4]diazepine-11-one (6.1 g., 0.0272 mole), phosphorus pentasulfide (6.51 g., 0.0286 mole) and 175 ml. of pyridine was evaporated in vacuo. The residue was stirred for 1 hour with one l. each of saturated aqueous sodium bicarbonate and methylene chloride and filtered to remove some solid product. The organic layer of the filtrate was washed successively with sodium bicarbonate solution and with saturated salt solution, dried over anhydrous magnesium sulfate and evaporated. The residue was combined with the solid obtained above and triturated with hot chloroform and methanol; 12.2 g. of 7-chloro-5,10-dihydro-11H-dibenzo[b,e][1,4]diazepine-11-thione was obtained of melting point 274–275° C. Concentration of the chloroform-methanol washings afforded an additional 8.4 g. of product having the same melting point. Recrystallization from dimethylformamide-water gave an analytical sample in the form of pale yellow needles of melting point 276–277° C.

*Preparation 7.*—5,10-Dihydro-5-methyl-11H-dibenzo[b,e][1,4]diazepine-11-thione

A mixture of 5,10-dihydro-5-methyl-11H-dibenzo[b,e][1,4]diazepin-11-one (6.1 g., 0.0272 mole), phosphorus pentasulfide (6.51 g., 0.0286 mole) and 175 ml. of pyridine was heated at reflux temperature for 3.75 hours and the pyridine was then evaporated in vacuo. The residue was shaken with chloroform and saturated aqueous sodium bicarbonate. The resulting suspension was filtered to give solid A. The chloroform layer of the filtrate was washed successively with saturated aqueous sodium bicarbonate and with saturated salt solution, dried over anhydrous magnesium sulfate, and evaporated. The residue was crystallized from methylene chloride-methanol to give 3.5 g. of 5,10-dihydro-5-methyl-11H-dibenzo[b,e][1,4]diazepin-11-thione of melting point 217–218° C., which was unchanged after recrystallization. A second crop weighed 0.8 g. and melted at 214–215° C. A third crop weighed 0.25 g. and melted at 216–217°.

Solid A was shaken with methylene chloride and 10% sodium hydroxide and processed as above to give an additional 1.5 g. melting at 216–217° C.

*Anal.*

Calcd. for $C_{14}H_{12}N_2S$: C, 69.96; H, 5.03; N, 11.66; S, 13.34.

Found: C, 69.79; H, 5.02; N, 11.37; S, 13.29.

*Example 1.*—3-methyl-9H-dibenzo[b,f]-s-triazolo[4,3-d][1,4]diazepine

A mixture of 5,10 - dihydro-11H-dibenzo[b,e][1,4]diazepine-11-thione prepared as described above (4.2 g.; 0.0186 mole) and acethydrazide (13.8 g.; 0.186 mole) was kept in a preheated oil bath for 50 minutes at 200° C. using a take-off condenser. It was cooled, water and chloroform were added and the suspension was filtered: 3.75 g. (81% yield) of 3-methyl-9H-dibenzo[b,f]-s-triazolo[4,3-d][1,4]diazepine of melting point 330° C. was obtained which did not change on crystallization from tetrahydrofuran.

*Anal.*

Calcd. for $C_{15}H_{12}N_4$: C, 72.56; H, 4.87; N, 22.57,
Found: C, 72.05; H, 4.66; N, 22.81.

*Example 2.*—9H-Dibenzo[b,f]-s-triazolo[4,3-d][1,4]diazepine

In the manner given in Example 1, 5,10-dihydro-11H-dibenzo[b,e][1,4]diazepine - 1 - thione was condensed at about 200° C. with formic acid hydrazide to give 9H-dibenzo[b,f] - s - triazolo[4,3-d][1,4]diazepine of melting point 283–285° C.

*Example 3.*—6,12-dichloro-9H-dibenzo[b,f]-s-triazolo[4,3-d][1,4]diazepine

In the manner given in Example 1, 2,8-dichloro-5,10-dihydro-11H-dibenzo[b,e][1,4]diazepine - 11 - thione was condensed at about 200° C. with formic acid hydrazide to give 6,12-dichloro - 9H - dibenzo[b,f]-s-triazolo[4,3-d][1-4]diazepine.

*Example 4.*—7-Chloro-3-methyl-9H-dibenzo-s-triazolo[4,3-d][1,4]diazepine

In the manner given in Example 1, 7-chloro-5,10-dihydro-11H-dibenzo[b,e][1,4]diazepine - 11 - thione was condensed at 200° C. with acethydrazide to give 7-chloro-3 - methyl-9H-dibenzo[b,f] - s - triazolo[4,3-d][1,4]diazepine of melting point 309–310°.

*Example 5.*—3-Methyl-7,11-difluoro-9H-dibenzo[b,f]-s-triazolo[4,3-d][1,4]diazepine In the manner given in Example 1, 3,7-difluoro-5,10-dihydro-11H-dibenzo[b,e][1,4]diazepine - 11 - thione was condensed at about 200° C. with acethydrazide to give 3-methyl-7,11-difluoro-9H-dibenzo[b,f] - s - triazolo[4,3-d][1,4]diazepine.

*Example 6.*—6,12-Dichloro-9H-dibenzo[c,f]-s-trizolo[4,3-a]azepine

In the manner given in Example 1, 3,8-dichloro-5,10-dihydro-6H-dibenzo[b,e]azepine-6-thione was condensed at about 200° C. with formic acid hydrazide to give 6,12-dichloro-9H-dibenzo[c,f]-s-triazolo[4,3-a]azepine.

*Example 7.—6,12-dichloro-9,9-dimethyl-9H-dibenzo-[c,f]-s-triazolo[4,3-a]azepine*

In the manner given in Example 1, 3,8-dichloro-11,11-dimethyl-5,11-dihydro - 6H - dibenz[b,e]azepine-6-thione was condensed at about 200° C. with formic acid hydrazide to give 6,12-dichloro - 9,9 - dimethyl - 9H - dibenzo[c,f]-s-triazolo[4,3-a]azepine.

*Example 8.—6,12-Dichloro-dibenzo[b,f]-s-triazolo[4,3-d][1,4]thiazepine*

In the manner given in Example 1, 2,8-dichlorodibenzo[b,f][1,4]thiazepine-11(10H)-thione was condensed at about 200° C. with formic acid hydrazide to give 6,12-dichlorodibenzo[b,f]-s-triazolo[4,3-d][1,4]thiazepine.

*Example 9.—6,12-Dichlorodibenzo[b,f]-s-triazolo[4,3-d][1,4]oxazepine*

In the manner given in Example 1, 2,8-dichlorodibenzo[b,f][1,4]oxazepine-11(10H)thione was condensed at about 200° C. with formic acid hydrazide to give 6,12-dichlorodibenzo[b,f]-s-triazolo[4,3-d][1,4]oxazepin.

*Example 10.—7,10-Diamino - 3 - [3-(dimethylamino)propyl]-9H-dibenzo[b,f]-s-triazolo[4,3-d][1,4]diazepine*

In the manner given in Example 1, 4,7-diamino-5,10-dihydro-11H-dibenzo[b,e][1,4]diazepine - 11 - thione was condensed at about 200° C. with 4 - (dimethylamino)butyric acid hydrazide to give 7,10-diamino-3-[3-(dimethylamino)propyl] - (9H) - dibenzo[b,f] - s - triazolo[4,3-d][1,4]diazepine.

*Example 11.—12-Amino-7-bromo-3-(cyanomethyl)-9H-dibenzo[c,f]-s-triazolo[4,3-a]azepine*

In the manner given in Example 1, 8-amino-2-bromo-5,11-dihydro-6H-dibenzo[b,e]azepine - 6 - thione was condensed at about 200° C. with cyanoacetic acid hydrazide to give 12-amino-7-bromo - 3 - (cyanomethyl) - 9H - dibenzo[c,f]-s-triazolo[4,3-a]azepine.

*Example 12.—3-Ethyl-12-chlorodizenbo[b,f]-s-triazolo[3,4-d][1,4]oxazepine*

In the manner given in Example 1, 2-chlorodibenzo[b,f][1,4]oxazepine-11(10H)-thione was condensed at about 200° C. with propionic acid hydrazide to give 3-ethyl-12-chlorodibenzo[b,f]-s-triazolo[3,4-d][1,4]oxazepine.

*Example 13.—7-Dipropylamino-11-iodo-3-methyldibenzo[b,f]-s-triazolo[4,3-d][1,4]thiazepine*

In the manner given in Example 1, 3-dipropylamino-7-iodidibenzo[b,e][1,4]thiazepin - 11(10H) - thione was condensed at about 200° C. with acethydrazide to give 11-dipropylamino-7-iodo - 3 - methyldibenzo[b,f]-s-triazolo[4,3-d][1,4]thiazepine.

*Example 14.—9-[3-(Dimethylamino)propyl] - 3 - methyl-9H-dibenzo[b,f]-s-triazolo[4,3-d][1,4]diazepine*

Sodium hydride (0.21 g.; 5 mmoles of 57% dispersion in mineral oil) was added to a solution of 3-methyl-9H-dibenzo[b,f] - s - triazolo[4,3-d][1,4]diazepine 1.24 g.; 5 mmoles) in 50 ml. of dimethylformamide, the mixture was stirred at room temperature for 25 minutes and then heated at 95° C. for 25 minutes. After another 15 minutes at room temperature, 3-(dimethylamino)propyl chloride (0.65 g.; 5 mmoles in 0.65 g. of xylene) was added and the mixture was heated at 95° C. for 21 hours. It was evaporated and the residue shaken with 25 ml. each of ether and water. The resulting suspension was filtered to give 0.6 g. of starting compound. The filtrate was separated into layers. The aqueous layer was extracted with methylene chloride (2× 20 ml.) and the combined organic extract was washed with saturated salt solution, dried over anhydrous magnesium sulfate and evaporated. The residue was triturated with ether to give 0.38 g. of 9-[3-(dimethylamino)propyl] - 3 - methyl - 9H - dibenzo[b,f]-s-triazolo[4,3-d][1,4]diazepine of melting point 165–167° C., raised to 170.5–171.5° on recrystallization from ethyl acetate.

*Anal.*
Calcd. for $C_{20}H_{23}N_5$: C, 72.04; H, 6.95; N, 21.01. Found: C, 71.82; H, 7.29; N, 21.12.

*Example 15.—9-[2-(dimethylamino)ethyl]-3-methyl-9H-dibenzo[b,f]-s-triazolo[4,3-d][1,4]diazepine*

In the manner given in Example 14, 3-methyl-9H-dibenzo[b,f]-s-triazolo[4,3-d][1,4]diazepine was first reacted with sodium hydride and then with 2-(dimethylaminoethyl)chloride to give 9-[2-(dimethylamino)ethyl]-3-methyl - 9H - dibenzo[b,f] - s - triazolo[4,3-d][1,4]diazepine of melting point 215–216° C.

*Example 16—9-[2-(dimethylamino)ethyl]-9H-dibenzo[b,f]-s-triazolo[4,3-d][1,4]diazepine*

In the manner given in Example 14, 9H-dibenzo[b,f]-s-triazolo[4,3-d][1,4]diazepine was first reacted with sodium hydride and then with 2-(dimethylamino)ethyl chloride to give 9-[2-(dimethylamino)ethyl]-9H-dibenzo[b,f]-s-triazolo[4,3-d][1,4]diazepine of melting point 137–138° C.

*Example 17—9-[3-(dimethylamino)propyl]-9H-dibenzo[b,f]-s-triazolo[4,3-d][1,4]diazepine*

In the manner given in Example 14, 9H-dibenzo[b,f]-s-triazolo[4,3-d][1,4]diazepine was first reacted with sodium hydride and then with 3-(dimethylamino)propyl chloride to give 9-[3-(dimethylamino)propyl]-9H-dibenzo - [b,f] - s - triazolo[4,3-d]diazepine of melting point 134.5–136.

*Example 18—7-Chloro-9-[3-(dimethylamino)propyl]-3-methyl-9Hdibenzo[b,f]-s-triazolo[4,3-d]diazepine*

In the manner given in Example 14, 7-Chloro-3-methyl-9H-dibenzo[b,f]-s-triazolo[4,3-d][1,4]diazepine was first reacted with sodium hydride and then with 3-(dimethylamino)propyl chloride to give 7-chloro-9-[3-dimethylamino)propyl-3-methyl-9H-dibenzo[b,f] - s - triazolo[4,3-d][1,4]diazepine of melting point 180–181° C.

*Example 19—11-Hydrazino-5H-dibenzo[b,e][1,4]-diazepine hydrochloride*

To a stirred solution of 5,10-dihydro-11H-dibenzo-[b,e][1,4]diazepine-11-thione (42.1 g., 0.0186 mole) in dry methanol (1,500 ml.) was added hydrazine hydrate (37.4 g., 0.743 mole, 100%). A nitrogen bubbler was used to aid in the removal of the hydrogen sulfide formed. The reaction mixture was refluxed via steam bath for 1½—hours and concentrated in vacuo. The oil was mixed with water and extracted with benzene. The benzene was washed with water several times, then acidified with aqueous hydrogen chloride. The hydrochloride salt was collected by filtration, washed with benzene and dried to give 37.0 g. (77%), which softens at 135–140° then completely melts at 251–254°. The aqueous layer of the filtrate was made basic with aqueous sodium hydroxide and extracted with chloroform. The chloroform was washed with water, dried (sodium sulfate) and concentrated in vacuo. The oil was dissolved in ethyl acetate and acidified with ethanolic hydrogen chloride to give 2.42 g., melting point 250–254° and 1.31 g., melting point 260–268° of additional product (overall yield 84%). The analytical sample had a melting point 253–255°.

*Anal.* Calcd. for $C_{13}H_{13}N_4Cl$: C, 59.88; H, 5.03; N, 21.49; Cl, 13.60. Found: C, 58.02; H, 5.01; N, 21.20; Cl, 13.13.

*Example 20.—11-(1-chloroacetylhydrazin-2-yl)-5H-dibenzo[b,e][1,4]diazepine hydrochloride*

11-Hydrazino-5H - dibenzo[b,e][1,4]diazepine hydrochloride (1.3 g., 0.005 mole) was dissolved in water made basic with sodium hydroxide (aqueous), extracted with chloroform, washed with water, dried over sodium sulfate and concentrated. The oil obtained was dissolved in 15 ml. dry tetrahydrofuran and cooled in an ice bath. Chloroacetyl chloride (0.565 g.; 0.005 mole) was mixed with 5 ml. of tetrahydrofuran and added slowly to the reaction mixture. A gummy solid appeared which formed a precipitate after stirring for one hour. The mixture was cooled and then stirring continued for 2 hours. The reaction flask was filtered, washed with chloroform, and then ether. The solid obtained was dried and used without further purification.

*Example 21.*—3-Chloromethyl-9H-dibenzo[b,f]-s-triazolo[4,3-d]-s-triazolo[4,3-d][1,4]diazepine 11-(1-chloroacetylhydrazin-2-yl) - 5H - dibenzo[b,e]-[1,4]diazepine hydrochloride (1.39 g., 0.004 mole) was mixed with acetic acid and refluxed under nitrogen at 123° in an oil bath. The reaction was stirred for 30 minutes, concentrated in vacuo and then diluted with water. The aqueous solution was neutralized with sodium bicarbonate and extracted with chloroform (precipitate is insoluble in chloroform). Methanol was added and the precipitate went into the chloroform layer. The chloroform methanol layer was washed with water and then with brine, dried over sodium sulfate and concentrated. The solid was crystallized with chloroform methanol and ethyl acetate to give 0.47 g. of 3-chloromethyl-9H-dibenzo[b,f]-s-triazolo[4,3-d][1,4]diazepine of melting point 280–295°. Further crops of 0.36 g. and 0.105 g. were obtained.

*Anal.* Calcd. for $C_{15}H_{11}N_4Cl$: C, 63.72; H, 3.92; N, 19.82; Cl, 12.54. Found: C, 63.31; H, 3.98; N, 19.67; Cl, 12.72.

*Example 22.*—2-[2-(2-Diethylamino)ethyl]-3-methyl-9H-dibenzo[b,f]-s-triazolo[4,3-d][1,4]diazepine In the manner given in Example 14, 3-methyl-9H-dibenzo[b,f]-s-triazolo[4,3-d][1,4]diazepine was reacted with sodium hydride and then with diethylaminoethyl bromide to give 9-[2-(diethylamino)ethyl]-3-methyl-9H-dibenzo[b,f]-s-triazolo[4,3-d][1,4]diazepine.

*Example 23.*—6,12-Dichloro-9-[2-(dipropylamino)ethyl]-3-methyl-9H - dibenzo[b,f] - s - triazolo[4,3-d][1,4]-diazepine In the manner given in Example 14, 6,12-dichloro-9H-dibenzo[b,f]-s-triazolo[4,3-d][1,4]diazepine was reacted with sodium hydride and then with (2-dipropylamino) chloride to give 6-12-dichloro - 9 - [2 - (dipropylamino)-ethyl] - 3 - methyl - 9H - dibenzo[b,f]-s-triazolo[4,3-d]-[1,4]diazepine.

*Example 24.*—7,11-Difluoro-9-ethyl-3-methyl-9H-dibenzo[b,f]-s-triazolo[4,3-d][1,4]diazepine In the manner give in Example 14, 7,11-difluoro-3-methyl-9H-dibenzo[b,f]-s-triazolo[4,3 - d][1,4]diazepine was reacted with sodium hydride and then with ethyl iodide to give 7,11-difluoro-9-ethyl-3-methyl-9H-dibenzo-triazolo[4,3-d]diazepine.

*Example 25.*—7-Chloro - 3,9 - bis[2 - (dimethylamino)-ethyl]-9H-dibenzo[b,f] - s - triazolo[4,3-d][1,4]diazepine In the manner given in Example 14, 7-chloro-3-[2-(dimethylamino)ethyl] - 9H - dibenzo[b,f] - s - triazolo[4,3-d][1,4]diazepine was reacted with sodium hydride and then with 2-(dimethylamino)ethyl bromide to give 7-chloro-3,9-bis[2-(dimethylamino)ethyl] - 9H - dibenzo[b,f]-s-triazolo[4,3-d][1,4]diazepine.

*Example 26.*—3-Bromo-9H-dibenzo[b,f]-s-triazolo-[4,3-d][1,4]diazepine

A stirred mixture of 9H-dibenzo[b,f]-s-triazolo[4,3-d][1,4]diazepine, N-bromosuccinimide and carbon tetrachloride was refluxed, under nitrogen for 4 hours cooled and concentrated in vacuo. The residue was mixed with water and extracted with chloroform. The extract was dried over anhydrous potassium carbonate and concentrated. Crystallization of the residue from ethyl acetate gave 3 - bromo - 9H - dibenzo[b,f] - s - triazolo[4,3-d][1,4]diazepine.

*Example 27.*—3-diethylamino-9H-dibenzo[b,f]-s-triazolo[4,3-d][1,4]diazepine

A mixture of 3 - bromo - 9H - dibenzo[b,f] - s - triazolo[4,3-d][1,4]diazepine and diethylamine was refluxed for 18 hours and then poured into water. The mixture was made alkaline with sodium bicarbonate and then extracted with chloroform. After evaporation of the chloroform extracts 3 - diethylamino - 9H - dibenzo[b,f]-s-triazolo[4,3-d][1,4]diazepine was obtained which was purified by crystallizations from ethanol-water.

*Example 28.*—3-Cyanomethyl-9H-dibenzo[b,f]-s-triazolo[4,3-d][1,4]diazepine

3-Chloromethyl - 9H - dibenzo[b,f] - s - triazolo[4,3-d][1,4]diazepine was added, under nitrogen to a stirred solution of sodium cyanide in dry dimethylsulfoxide which had been warmed in a bath maintained at 84° C. After 30 minutes the mixture was cooled, and poured into water; the product was extracted with chloroform. The extract was washed with brine, dried over anhydrous potassium carbonate and concentrated. The residue was crystallized from ethyl acetate-Skellysolve B hexanes to give 3 - cyanomethyl - 9H - dibenzo[b,f] - s - triazolo-[4,3-d][1,4]diazepine.

*Example 29.*—3-Cyano-9H-dibenzo[b,f]-s-triazolo-[4,3-d][1,4]diazepine

In the manner given in Example 28, 3-chloro-9H-dibenzo[b,f]-s-triazolo[4,3-d][1,4]diazepine was treated with potassium cyanide to give 3-cyano-9H-dibenzo[b,f]-s-triazolo[4,3-d][1,4]diazepine.

*Example 30.*—9H-Dibenzo[b,f]-s-triazolo[4,3-d][1,4]diazepin-3-acetic acid methyl ester A mixture of 3-cyanomethyl-9H-dibenzo[b,f]-s-triazolo[4,3-d][1,4]diazepine, methanol and ether was cooled in a salt-ice bath and the reaction mixture saturated with a stream of anhydrous hydrogen chlorine during 15 minutes. The mixture was allowed to warm slowly to ambient temperature and stand for 18 hours. It was then poured into water, neutralized with sodium bicarbonate and extracted with chloroform. The extract was washed with brine, dried and concentrated. The residue was crystallized from methanol-ethyl acetate to give 9H-dibenzo[b,f]-s-triazolo[4,3-d][1,4]diazepin-3-acetic acid methyl ester.

*Example 31.*—6,12-Dichloro-3-[1-methyl-piperidin-2-yl]-9H-dibenzo[b,f]-s-triazolo[4,3-d][1,4]diazepine In the manner given in Example 1, 2,8-dichloro-5,10-dihydro - 11H - dibenzo[b,e][1,4]diazepine-11-thione was condensed with [(1-methyl)piperidinyl]formic acid hydrazide at about 200° C. to give 6,12-dichloro - 3 - [1-methylpiperidin - 2 - yl] - 9H - dibenzo[b,f] - s - triazolo-[4,3-d][1,4]diazepine.

*Example 32.*—3[(Dimethylamino)methyl]-9H-dibenzo-[b,f]-s-triazolo[4,3-d][1,4]diazepine To a stirred solution of 3-chloromethyl-9H - dibenzo-[b,f] - s - triazolo[4,3 - d][1,4]diazepine (1.41 g., 0.005 mole) in dry tetrahydrofuran (25 ml.) was added potassium iodide (1.66 g.) and dimethylamine (15 ml. of a saturated solution in methanol) under nitrogen. The mixture was stirred at ambient temperature for 2 hr., mixed with water dried over sodium sulfate and concentrated in vacuo. The oil was crystallized from methanol, chloroform-ethyl acetate to give 1.29 g. (89%), melting point 210–215° of 3-[(dimethylamino)methyl]9-H - dibenzo [b,f]-s-triazolo[4,3-d][1,4]diazepine. The analytical sample had a melting point of 214–216°.

Anal. Calc. for $C_{17}H_{17}N_5$: C, 70.08; H, 5.88; N, 24.04. Found: C, 70.40; H, 5.84; N, 24.51.

*Example 33.*—3-[(Diethylamino)methyl]-9H-dibenzo-[b,f]-s-triazolo[4,3-d][1,4]diazepine To a stirred solution of 3-chloromethyl-9H-dibenzo-[b,f] - s - triazolo[4,3-d][1,4]diazepine (1.41 g. 0.005 mole) in dry tetrahydrofuran (25 ml.) and methanol (5 ml.) was added potassium iodide (1.66 g.) and diethylamine (5 ml.) under nitrogen. The mixture was stirred at ambient temperature for 2 hr., mixed with water and extracted with chloroform. The chloroform solution was washed with water, dried over sodium sulfate and concentrated in vacuo. The oil was crystallized from methanol chloroform ethyl acetate to give 1.35 g. (85%) of 3-[(diethylamino)methyl]-9H - dibenzo[b,f] - s - triazolo[4,3-d][1,4]diazepine of melting point 232–235°. The analytical sample had a melting point of 232–235°.

Anal. Calcd. for $C_{19}H_{21}N_5$: C, 71.44; H, 6.63; N, 21.93. Found: C, 70.95; H, 6.70; N, 21.51.

*Example 34.*—(Pyrrolidinomethyl)-9H-dibenzo[b,f]-s-triazolo[4,3-d][1,4]diazepine To a stirred solution of 3-chloromethyl-9H-dibenzo [b,f] - s - triazolo[4,3 - d][1,4]diazepine (1.41 g., 0.005 mole) in dry tetrahydrofuran (20 ml.) and methanol (5 ml.) was added potassium iodide (1.66 g.) and pyrrolidine (5 ml.) under nitrogen. The mixture was stirred at ambient temperature for 2 hr., mixed with water and extracted with chloroform. The chloroform was washed with water, dried over sodium sulfate and concentrated in vacuo. The oil was crystallized from methanol ethyl acetate to give 1.26 g. (80%), of melting point 100–107° of 3-(pyrrolidino-9H-dibenzo[b,f] - s - triazolo[4,3-d][1,4]diazepine. The analytical sample had a melting point of 100–107° (foaming).

Anal. Calcd. for $C_{19}H_{19}N_5$: C, 71.90; H, 6.03; N, 22.07; Found: C, 71.63; H, 6.26; N, 22.0.

*Example 35.*—3-(2-Chloroethyl)-9H-dibenzo[b,f]-s-triazolo[4,3-d][1,4]diazepine

11 - Hydrazino - 5H - dibenzo[b,e][1,4]diazepine hydrochloride (13.0 g., 0.05 mole) was dissolved in water, neutralized with aqueous sodium hydroxide and extracted with chloroform. The chloroform was washed with water, dried over sodium sulfate and concentrated in vacuo. The oil was dissolved in dry tetrahydrofuran (200 ml.), under nitrogen and 3-chloropropionyl chloride (6.35 g., 0.05 mole) in tetrahydrofuran (50 ml.) was added slowly to the stirred solution. The reaction mixture was stirred at ambient temperature for 2½ hour. The hydrochloride salt of the adduct was collected by filtration, washed with ether and dried in a vacuum oven (40°) to give 1.431 g.

This hydrochloride salt was combined with glacial acetic acid (150 ml.) and heated, under nitrogen in an oil bath at 120° for 15 minutes. The reaction mixture was cooled and the precipitate collected by filtration and washed with acetic acid. The precipitate was mixed with water and chloroform, neutralized with aqueous sodium hydroxide and recollected by filtration. The chloroform was separated, washed with water, dried over sodium sulfate and concentrated in vacuo. These two residues were recrystallized from methanol chloroform ethyl acetate to give 4.37 g. (37%), melting point 90–92° of 3-(2-chloroethyl)-9H - dibenzo[b,f]-s-triazolo[4,3-d][1,4]diazepine. The analytical sample had a melting point of 94–97.5°.

*Anal.*

Calcd. for $C_{16}H_{13}N_4Cl$: C, 64.75; H, 4.41; N, 18.88; Cl, 11.95.
Found: C, 65.88; H, 4.39; N, 19.90; Cl. 10.49.

*Example 36.*—3-[2-(Dimethylamino)ethyl]-9H-dibenzo [b,f]-s-triazolo[4,3-d][1,4]diazepine To a stirred solution of 3-(2-chloroethyl)-9H-dibenzo [b,f]-s-triazolo[4,3-d][1,4]diazepine (1.48 g., 0.005 mole) in dry dimethylformamide (25 ml.) was added potassium iodide (1.66 g.) and dimethylamine (4.745 g., in 5 ml. methanol) under nitrogen. The mixture was stirred at ambient temperature for 18 hr., mixed with water and extracted with chloroform. The chloroform was washed with water, dried over sodium sulfate and concentrated in vacuo. The oil was crystallized twice from methanol ethyl acetate to give 0.48 g. of 3-[2-(dimethylamino)ethyl]-9H-dibenzo[b,f] - s - triazolo[4,3-d][1,4-diazepine (32%), melting point 161–165°. The analytical sample had a melting point of 161–165°.

*Anal.*

Calcd. for $C_{18}H_{19}N_5$: C, 70.79; H, 6.27; N, 22.94.
Found: C, 70.70; H, 6.33; N, 23.11.

*Example 37.*—3-(2-Pyrrolidinoethyl)-9H-dibenzo[b,f]-s-triazolo[4,3-d][1,4]diazepine To a stirred solution of 3-(2-chloroethyl)-9H-dibenzo [b,f] - s - triazolo[4,3 - d][1,4]diazepine (1.48 g., 0.005 mole) in dry dimethylformamide (25 ml.) was added potassium iodide (1.66 g.) and pyrrolidine (5 ml.) under nitrogen. The mixture was stirred at ambient temperature for 18 hr., mixed with water, dried over sodium sulfate and concentrated in vacuo. The oil was crystallized twice from methanol ethyl acetate to give 0.71 g. (43%) of 3-(2-pyrrolidinoethyl)-9H - dibenzo[b,f] - s - triazolo[4,3-d][1,4] diazepine of melting point 208–210°. The analytical sample had a melting point of 208–210°.

*Anal.*

Calcd. for $C_{20}H_{21}N_5$: C, 72.48; H, 6.39; N, 21.13.
Found: C, 72.96; H, 6.55; N, 21.53.

*Example 38.*—3-Vinyl-9H-dibenzo[b,f]-s-triazolo[4,3-d][1,4]diazepine

To a stirred solution of 3-(2-chloroethyl)-9H-dibenzo [b,f]-s-triazolo[4,3 - d][1,4]diazepine (1.26 g., 0.00425 mole) in dry dimethylformamide (25 ml.) was added potassium iodide (1.66 g.) and diethylamine (5 ml.) under nitrogen. The mixture was stirred at ambient temperature for 18 hr., mixed with water and extracted with chloroform. The chloroform was washed with water, dried over sodium sulfate and concentrated in vacuo. The residue was collected, washed with ethyl acetate and recrystallized from methanol ethyl acetate to give 0.545 g. (38%) of 3-vinyl-9H-dibenzo[b,f] - s - triazolo[4,3 - d][1,4]diazepine of melting point >300°. The analytical sample had a melting point of >300°.

*Anal.*

Calcd. for $C_{16}H_{12}N_4$: C, 73.82; H, 4.65; N, 21.53.
Found: C, 73.40; H, 4.69; N, 20.79.

*Example 39.*—3-(3-Chloropropyl)-9H-dibenzo[b,f]-s-triazolo[4,3-d][1,4]diazepine 11-Hydrazino-5H - dibenzo[b,e][1,4]diazepine hydrochloride (13.08 g., 0.05 mole) was dissolved in water, neutralized with aqueous sodium hydroxide and extracted with chloroform. The chloroform was washed with water, dried over sodium sulfate and concentrated in vacuo. The oil was dissolved in dry tetrahydrofuran (150 ml.) under nitrogen and 4-chlorobutyryl chloride (7.05 g., 0.05 mole) in dry tetrahydrofuran (50 ml.) was slowly added to the stirred solution. The reaction mixture was stirred at ambient temperature for 4 hr. The hydrochloride salt of the adduct was collected by filtration, washed with ether and dried in a vacuum oven (40°) to give 14.123 g.

This hydrochloride salt was combined with glacial acetic acid (100 ml.) and heated under nitrogen in an oil bath at 120° for 15 minutes. The reaction mixture was cooled and the precipitate collected by filtration and washed with acetic acid. The filtrate was concentrated in vacuo, mixed with water, neutralized with aqueous sodium hydroxide and extracted with chloroform. The collected precipitate from above was mixed with water and chloroform, neutralized with aqueous sodium hydroxide and the chloroform separated. The two chloroform solutions were combined, washed with water, dried over sodium sulfate and concentrated in vacuo. The residue was dissolved in methanol chloroform decolorized with Darco and crystallized by concentrating and adding ethyl acetate to give 8.76 g. of 3-(3-chloropropyl)-9H-dibenzo[b,f]-s-triazolo-[4,3-d][1,4]diazepin of melting point 175–177 and 2.28 g., melting point 171–172° (overall yield 92%). The analytical sample had a melting point of 173–175° C.

*Anal.*

Calcd. for $C_{17}H_{15}N_4Cl$: C, 65.69; H, 4.86; N, 18.03; Cl, 11.41.

Found: C, 65.38; H, 5.00; N, 18.04; Cl, 11.60.

*Example 40.*—3-[3-(Dimethylamino)propyl]-9H-dibenzo[b,f]-s-triazolo[4,3][1,4]diazepine dihydrochloride To a stirred solution of 3-(3-chloropropyl)-9H-dibenzo[b,f] - s - triazolo[4,3-d][1,4]diazepine (1.55 g., 0.005 mole) in dry dimethylformamide (25 ml.) was added potassium iodide (1.66 g.) and dimethylamine (15 ml. of a saturated methanol solution) under nitrogen. The mixture was stirred at ambient temperature for 40 hr. and at 50° for 18 hr. to complete the reaction. The mixture was mixed with water and extracted with chloroform. The chloroform was washed with water, dried over sodium sulfate and concentrated in vacuo. The oil was dissolved in ethyl acetate acidified with methanolic hydrogen chloride and recrystallized from methanol ethyl acetate to give 1.74 g. of 3-[3-(dimethylaminopropyl] - 9H - dibenzo[b,f]-s-triazolo[4,3 - d][1,4]diazepine dihydrochloride (94%) of melting point 290–293°. The analytical sample had a melting point of 291–296°.

*Anal.*

Calcd. for $C_{19}H_{23}N_5Cl_2$: C, 55.13; H, 6.80; N, 18.91; Cl, 19.15.

Found: C, 57.47; H, 5.90; N, 17.89, Cl, 17.99.

*Example 41.*—3-[3-(diethylamino)propyl]-9H-dibenzo-[b,f]-s-triazolo[4,3-d][1,4]diazepine dihydrochloride To a stirred solution of 3-(3-chloropropyl)-9H-dibenzo[b,f]-s-triazolo[4,3-d][1,4]diazepine (1.55 g., 0.005 mole) in dry dimethylformamide (25 ml.) was added potassium iodide (1.66 g.) and diethylamine (5 ml.) under nitrogen. The mixture was stirred at ambient temperature, was mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.30 g., of 3-[3-(diethylamino)propyl]-9H-dibenzo[b,f]-s-triazolo[4,3-d][1,4]diazepine dihydrochloride of melting point 278–283° and 0.21 g., of melting point 275–285° (overall yield 72%). The analytical sample had a melting point of 275–280°.

*Anal.*

Calcd. for $C_{21}H_{27}N_5Cl_2$: C, 59.99; H, 6.47; N, 16.66; Cl, 16.87.

Found: C, 59.32; H, 6.37; N, 16.10; Cl, 16.65.

*Example 42.*—3-(3-Pyrrolidinopropyl)-9H-dibenzo[b,f]-s-triazol[4,3-d][1,4]diazepine dihydrochloride To a stirred solution of 3-(3-chloropropyl)-9H-dibenzo[b,f]-s-triazolo[4,3-d][1,4]diazepine (1.55 g. 0.005 mole) in dry dimethylformamide (25 ml.) was added potassium iodide (1.66 g.) and pyrrolidine (5 ml.) under nitrogen. The mixture was stirred at ambient temperature for 40 hr., mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.65 g., of 3-(3-pyrrolidinopropyl)-9H-dibenzo[b,f]-s-triazolo[4,3 - d][1,4]diazepine dihydrochloride of melting point 285–290° (overall yield 91%). The analytical sample had a melting point of 295–300°.

*Anal.*

Calcd. for $C_{21}H_{25}N_5Cl_2$: C, 60.28; H, 6.02; N, 16.74; Cl, 16.95.

Found: C, 59.80; H, 5.93; N, 17.04; Cl, 16.85.

*Example 43.*—3-(2-Pyridyl)-9H-dibenzo[c,f]-s-triazolo-[4,3-a]azepine

A mixture of 6(5H)-morphanthridinethione (2.25 g., 0.01 mole) and picolinic acid hydrazide (13.7 g.; 0.1 mole) was kept in a preheated oil bath at 155–160° C. for 15 minutes and then at 200–215° C. for 45 minutes using a take-off condenser. The mixture was cooled, dissolved in methylene chloride and water and the resulting suspension was filtered to give 4 g. of solid A, and filtrate B. Solid A was discarded.

Filtrate B was separated into layers over anhydrous magnesium sulfate and the organic layer was washed with saturated salt solution, dried over anhydrous magnesium sulfate and evaporated. The residue (5.6 g.) was chromatographed on 560 g. of silica gel using 5% methanol-95% chloroform. Fractions 1–28 (100 ml. each) gave no material. Fractions 29–30 (100 ml. each) gave 1.121 g. which was crystallized from methylene chloride ether to give 0.62 g. of 3-(2-pyridyl)-9H-dibenzo[c,f]-s-triazolo[4,3-d] azepine of melting point 264–266° C., raised to 266–267.5° C. on recrystallization.

*Anal.*

Calcd. for $C_{20}H_{14}N_4 \cdot \tfrac{1}{2}H_2O$: C, 75.22; H, 4.73; N, 17.55.

Found: C, 75.04; H, 4.43; N, 17.46.

*Example 44.*—3-[(Chloro)methyl-9H-dibenzo[c,f]-s-triazolo[4,3-a]azepine

To a stirred ice-cold solution of 6-hydrazinomorphanthridine (2.23 g., 0.01 mole) in dry tetrahydrofuran (25 ml.), under nitrogen was slowly added chloroacetyl chloride (1.12 g., 0.01 mole) in tetrahydrofuran (5 ml.). After 15 minutes the ice-bath was removed and the reaction allowed to rise to ambient temperature (21–24° C.) and stirred for 1 hour. The hydrochloric acid salt of the adduct was collected by filtration, washed with ether and dried in a vacuum oven (40° C.) to give 3.32 g. of product. This hydrochloric acid salt was combined with glacial acetic acid (40 ml.) and heated, under nitrogen in an oil bath at 120° C. for 20 minutes. The acetic acid was removed in vacuo and the residue mixed with water, neutralized with sodium bicarbonate and extracted with chloroform. The extract was washed with water, dried over anhydrous sodium sulfate and concentrated. The residue was chromatographed on silica gel (280 g.) with 5 percent methanol-95 percent chloroform. The product thus obtained was crystallized from ethyl acetate Skellysolve B hexanes to give 1.82 (65%) of 3-[(chloro)methyl]-9H-dibenzo[c,f] - s - triazolo[4,3-a]azepine of melting point 148–150° C.

*Anal.*

Calcd. for $C_{16}H_{12}N_3Cl$: C, 68.20; H, 4.30; N, 14.91; Cl, 12.59.

Found: C, 66.94; H, 4.25; N, 15.44; Cl, 13.64.

*Example 45.*—3-[(Dimethylamino)methyl]-9H-dibenzo-[c,f]-s-triazolo[4,3-a]azepine To a stirred solution of 3-(chloromethyl)-9H-dibenzo [c,f]-s-triazolo[4,3-a]azepine in tetrahydrofuran was added sodium iodide (1.5 g., 0.01 mole) and dimethylamine (125 ml. of a saturated methanol solution (under nitrogen. The mixture was stirred at ambient temperature for one and one-half hours, diluted with cold water and extracted with chloroform. The extract was washed with water, dried over anhydrous sodium sulfate and concentrated in vacuo. The residue was dissolved in ethanol and precipitated upon concentrating to give 2.12 g. of a product of melting point 172–174° C. (73%). This product was recrystallized from ethanol-ethyl acetate to give 1.55 g. of melting point 173–175° and 0.95 g. of melting point 168–180° of 3-[(dimethylamino)methyl]-9H-dibenzo[c,f] - s - triazolo[4,3-a] azepine. The analytical sample had a melting point of 173–175° C.

*Anal.*

Calcd. for $C_{18}H_{18}N_4$: C, 74.45; H, 6.25; N, 19.30. Found: C, 74.23; H, 6.22; N, 19.61.

Example 46.—9H-Dibenzo[c,f]-s-triazolo[4,3-a]azepine

To a stirred ice-cold solution of 6-hydrazinomorphanthridine (13.40 g., 0.06 mole) in dry chloroform (480 ml.) was added triethylorthoformate (44.4 g., 0.3 mole), under nitrogen, and sulfuric acid (6.6 ml.) dropwise. After 15 min. the ice-bath was removed and the reaction mixture allowed to rise to ambient temperature and then stirred for 2 hours. The chloroform was washed with aqueous sodium bicarbonate solution, thereupon with water, dried over anhydrous sodium sulfate, treated with water and concentrated in vacuo. The oil was dissolved in ethyl acetate and crystallized to give 6.41 g. of melting point 154–160° C. and 5.05 g. of melting point 165–168° C. of 9H-dibenzo[c,f] - s - triazolo[4,3-a]azepine (overall yield 82%). The analytical sample had a melting point 165–168° C.

*Anal.*

Calcd. for $C_{15}H_{11}N_3$: C, 77.23; H, 4.75; N, 18.02. Found: C, 76.85; H, 4.76; N, 17.50.

Example 47.—3-(3-Pyridyl)-9H-dibenzo[c,f]-s-triazolo-[4.3-a]azepine

A mixture of 6(5H)-morphanthridinethione (2.25 g.; 0.01 mole) and nicotinic acid hydrazide (13.7 g.; 0.1 mole) was kept in a preheated oil bath at 215–225° C. for 1.75 hours. The mixture was then taken up in methylene chloride and water and the resulting suspension was filtered to give Filtrate A and 2.7 g. of solid which solid was discarded.

Filtrate A was separated into layers, the organic layer was washed with saturated salt solution, dried over anhydrous magnesium sulfate and evaporated. Crystallization from methanol gave 1.7 g. of 3-(3-pyridyl)-9H-dibenzo[c,g]-s-triazolo[4,3-a]azepine of melting point 266–267° C., unchanged on recrystallization.

*Anal.*

Calcd. for $C_{20}H_{14}N_4$: C, 77.40; H, 4.55; N, 18.04. Found: C, 77.22; H, 4.67; N, 18.13.

Example 48.—3-(4-Pyridyl)-9H-dibenzo[c,f]-s-triazolo-[4,3-a]azepine

A mixture of 6(5H)-morphanthridinethione (2.25 g.; 0.01 mole) and isonicotinic acid hydrazide (13.7 g.; 0.1 mole) was kept in a preheated oil bath at 215–225° C. for 1.5 hours. The mixture was taken up in methylene chloride and water, the resulting suspension was filtered giving filtrate A and a gummy solid which was discarded.

Filtrate A was separated into layers, the organic layer was washed with saturated salt solution, dried over anhydrous magnesium sulfate and evaporated. Crystallization from methanol gave 1.2 g. of 3-(4-pyridyl)-9H-dibenzo[c,f]-s-triazolo[4,3-a]azepine of melting point 271–273° C., raised to 273–274.5° C. on recrystallization.

*Anal.*

Calcd. for $C_{20}H_{14}N_4$: C, 77.40; H, 4.45; N, 18.05. Found: C, 77.27; H, 4.59; N, 17.81.

Example 49.—3-[(Diethylamino)methyl]-9H-dibenzo-[c,f]-s-triazolo[4.3-a]azepine

To a stirred solution of 3 - chloromethyl - 9H - dibenzo-[c,f]-s-triazolo[4,3-a]azepine (2.82 g., 0.01 mole) in dry tetrahydrofuran (100 ml.) was added sodium iodide (1.5 g., 0.01 mole) and diethylamine (10 ml.) under nitrogen. The mixture was stirred at ambient temperature for 1½ hours, mixed with cold water and extracted with chloroform. The chloroform was washed with water, dried over sodium sulfate and concentrated in vacuo. The residue was recrystallized twice from ethyl acetate-Skelly B to give 0.98 g., of melting point 132–135° and 0.70 g., melting point 130–133° (overall yield 53%) of 3-[(diethylamino)methyl]-9H-dibenzo[c,f] - s - triazolo[4,3-a]azepine. The analytical sample had a melting point of 132–134°.

*Anal.*

Calcd. for $C_{20}H_{22}N_4$: C, 75.44; H, 6.96; N, 17.60. Found: C, 74.97; H, 6.94; N, 17.95.

Example 50.—3-(Pyrrolidinomethyl)-9H-dibenzo[c,f]-s-triazolo[4,3-a]azepine

To a stirred solution of 3-chloromethyl-9H-dibenzo-[c,f]-s-triazolo[4,3-a]azepine (2.82 g., 0.01 mole) in dry tetrahydrofuran (100 ml.) was added sodium iodide (1.50 g., 0.01 mole) and pyrrolidine (10 ml.) under nitrogen. The mixture was stirred at ambient temperature for 1½ hr., mixed with cold water and extracted with chloroform. The chloroform was washed with water, dried over sodium sulfate and concentrated in vacuo. The residue was crystallized from ethyl acetate-Skelly B to give 1.315 g., (42%), melting point 168–171° of 3-(pyrrolidinomethyl)-9H - dibenzo[c,f] - s - triazolo[4,3-a]azepine. The analytical sampe had a melting point of 168–171°.

*Anal.*

Calcd. for $C_{20}H_{20}N_4$: C, 75.92; H, 6.37; N, 17.71. Found: C, 75.57; H, 6.45; N, 17.73.

Example 51.—3-(2-Chloroethyl)-9H-dibenzo[c,f]-s-triazolo[4,3-a]azepine

To a stirred ice-cold solution of 6-hydrazinomorphanthridine (2.23 g., 0.01 mole) in dry tetrahydrofuran (25 ml.) was slowly added 3-chloropropionyl chloride (1.27 g., 0.01 mole) in tetrahydrofuran (5 ml.) under nitrogen. After 20 minutes the ice bath was removed and the mixture was allowed to rise to ambient temperature, and stirred for 1 hr. The hydrochloric acid salt was collected by filtration, washed with ether and dried in a vacuum oven (40°) to give 3.50 g.

This hydrochloride was combined with glacial acetic acid (40 ml.) and heated under nitrogen in an oil bath at 120° for 10–15 min. The acetic acid was removed in vacuo and the residue mixed with water, neutralized with sodium bicarbonate and extracted with chloroform. The chloroform was washed with water, dried over sodium sulfate and concentrated in vacuo. The residue was crystallized from methanol chloroform ethyl acetate to give 1.19 g., of melting point 178–183° and 0.65 g., of melting point 182–183° (overall yield 62%) of 3-(2-chloroethyl)-9H-dibenzo[c,f]-s-triazolo[4,3-a]azepine. The analytical sample had a melting point of 182–183°.

*Anal.*

Calcd. for $C_{17}H_{14}N_3Cl$: C, 69.03; H, 4.77; N, 14.21; Cl, 11.99.

Found: C, 68.72; H, 4.77; N, 13.85; Cl. 12.19.

Example 52.—3-[2-(Dimethylamino)ethyl]-9H-dibenzo-[c,f]-s-triazolo[4,3-a]azepine To a stirred solution of 3-(2-chloroethyl)-9H-dibenzo-[c,f]-s-triazolo[4,3-a]azepine (1.48 g., 0.005 mole) in dry dimethylformamide (25 ml.) was added potassium iodide (1.66 g., 0.01 mole) and dimethylamine (15 ml. of a saturated solution in methanol) under nitrogen. The mixture was stirred at ambient temperature for 4 hr., mixed with cold water and extracted with methylene chloride. The methylene chloride extract was washed with water, dried over sodium sulfate and concentrated in vacuo. The residue was crystallized from ethyl acetate-Skellysolve B hexanes to give 0.96 g. (63%), of melting point 110–111°. This was recrystallized from ethyl acetate-Skellysolve B hexanes and seeded with the higher melting polymorph (melting point 137–138°) to give 0.90 g., of melting point 136–139° of 3-[2-(dimethylamino)ethyl] - 9H - dibenzo[c,f] - s - triazolo[4,3-a]azepine. The analytical sample had a melting point of 135–137°.

*Anal.*

Calcd. for $C_{19}H_{20}N_4$: C, 74.97; H, 6.62; N, 18.41.
Found: C, 74.80; H, 6.81; N, 18.29.

Example 53.—3-(2-Pyrrolidinoethyl)-9H-dibenzo-[c,f]-s-triazolo[4,3-a]azepine

To a stirred solution of 3-(2-chloroethyl)-9H-dibenzo[c,f]-s-triazolo[4,3-a]azepine (1.48 g., 0.005 mole) in dry dimethylformamide (20 ml.) was added potassium iodide (1.66 g., 0.01 mole) and pyrrolidine (10 ml.) under nitrogen. The mixture was stirred at ambient temperature for 20 hr., mixed with water and extracted with chloroform. The chloroform was washed with water, dried over sodium sulfate and concentrated in vacuo. The residue was crystallized from ethyl acetate Skelly B to give 1.11 g. (67%) of melting point 176–179° of 3-(2-pyrrolidinoethyl) - 9H - dibenzo[c,f] - s - triazolo-[4,3-a]azepine. The analytical sample had a melting point of 176–179°.

*Anal.*

Calcd. for $C_{21}H_{22}N_4$: C, 76.33; H, 6.71; N, 16.96.
Found: C, 76.01; H, 6.89; N, 17.34.

Example 54.—3-(3-Chloropropyl)-9H-dibenzo-[c,f]-s-triazolo[4,3-a]azepine

To a stirred ice-cold solution of 6-hydrazinomorphanthriidine (6.69 g., 0.03 mole) in dry tetrahydrofuran (100 ml.) under nitrogen was slowly added 4-chlorobutyryl chloride (4.23 g., 0.03 mole) in tetrahydrofuran (25 ml.). After 30 minutes the ice-bath was removed and the reaction allowed to rise to ambient temperature and stirred for 1 hr. The hydrochloride salt of the adduct was collected by filtration, washed with ether and dried in a vacuum oven (40°) to give 10.37 g.

This hydrochloride was combined with glacial acetic acid (50 ml.) and heated, under nitrogen in an oil bath at 120° for 15 min. The acetic acid was removed in vacuo and the residue mixed with water, neutralized with sodium bicarbonate and extracted with chloroform. The chloroform was washed with water, dried over sodium sulfate and concentrated in vacuo. The oil was dissolved in ethyl acetate and crystallized upon concentration to give 7.46 g., of melting point 179–181° and 0.56 g., of melting point 180–181° (overall yield 89%) of 3-(3-chloropropyl)-9H-dibenzo[c,f]-s-triazolo[4,3-a]azepine. The analytical sample was recrystallized from methanol-ethyl acetate and had a melting point of 188–190° C.

*Anal.*

Calcd. for $C_{18}H_{16}N_3Cl$: C, 69.78; H, 5.21; N, 13.56; Cl, 11.45.
Found: C, 69.77; H, 5.20; N, 13.59; Cl, 11.98.

Example 55.—3-[3-Dimethylamino)propyl]-9H-dibenzo-[c,f]-s-triazolo[4,3-a]azepine dihydrochloride To a stirred solution of 3-(3-chloropropyl)-9H-dibenzo[c,f]-s-triazolo[4,3-a]azepine (3.10 g., 0.01 mole) in dry dimethylformamide (50 ml.) was added sodium iodide (0.50 g.) and dimethylamine (10 ml.) of 25% aqueous solution) under nitrogen. The mixture was stirred and heated in a steambath overnight, mixed with water, neutralized with sodium bicarbonate and extracted with chloroform. The chloroform was dissolved in ethyl acetate, acidified with ethanolic hydrogen chloride and the salt recrystallized from methanol ethyl acetate to give 0.245 g. of melting point 259–267° and 1.105 g., of melting point 259–266° (overall yield 69% of 3-[3-dimethylamino)propyl] - 9H - dibenzo[c,f]-s-triazolo[4,3-a]azepine dihydrochloride. The analytical sample had a melting point of 259–266°.

*Anal.*

Calcd. for $C_{20}H_{24}N_4Cl_2$: C, 61.38; H, 6.18; N, 14.32; Cl, 18.12.
Found: C, 61.11; H, 6.20; N, 14.48; Cl, 18.12.

Example 56.—3-[3-Diethylamino)propyl]-9H-dibenzo-[c,f]-s-triazolo[4,3-a]azepine dihydrochloride To a stirred solution of 3-(3-chloropropyl)-9H-dibenzo[c,f]-s-triazolo[4,3-a]azepine (1.55 g., 0.005 mole) in dry dimethylformamide (50 ml.) was added potassium iodide (1.66 g., 0.01 mole) and diethylamine (15 ml.) under nitrogen. The mixture was stirred at ambient temperature for 18 hr. but was raised to 50° for 24 hr. to complete the reaction. The mixture was mixed with water and extracted with chloroform. The chloroform was washed with water, dried over sodium sulfate and concentrated in vacuo. The oil was dissolved in ethyl acetate, treated with Darco acidified with methanolic hydrogen chloride and recrystallized from methanol ethyl acetate to give 1.43 g. (68%), of melting point 258–263° of 3-[3-(diethylamino)propyl] - 9H - dibenzo[c,f] - s - triazolo[4,3-a]azepine dihydrochloride. The analytical sample had a melting point of 256–262°.

*Anal.*

Calcd. for $C_{22}H_{28}N_4Cl_2$: C, 63.00; H, 6.73; N, 13.36; Cl, 16.91.
Found: C, 62.77; H, 6.89; N, 13.30; Cl, 17.50.

Example 57.—3-(Pyrrolidinopropyl)-9H-dibenzo[c,f]-s-triazolo[4,3-a]azepine dihydrochloride To a stirred solution of 3-(3-chloropropyl)-9H-dibenzo[c,f]-s-triazolo[4,3-a]azepine (1.55 g., 0.005 mole) in dry dimethylformamide (50 ml.), was added potassium iodide (1.66 g., 0.01 mole) and pyrrolidine (15 ml.) under nitrogen. The mixture was stirred at ambient temperature for 18 hr., mixed with water and extracted with chloroform. The chloroform was washed with water, dried over sodium sulfate and concentrated in vacuo. The oil was dissolved in ethyl acetate, acidified with methanolic hydrogen chloride and recrystallized from methanol-ethyl acetate to give 1.92 g. (92%), of melting point 265–270° of 3-(3-pyrrolidinopropyl)-9H-dibenzo-[c,f]-s-triazolo[4,3-a]azepine dihydrochloride. The analytical sample had a melting point of 265–270°.

*Anal.*

Calcd. for $C_{22}H_{26}N_4Cl_2$: C, 63.30; H, 6.28; N, 13.42; Cl, 16.99.
Found: C, 62.89; H, 6.38; N, 13.45; Cl, 17.20.

Example 58.—3-Vinyl-9H-dibenzo[c,f]-s-triazolo [4,3-a]azepine

To a stirred solution of 3-(2-chloroethyl)-9H-dibenzo [c,f]-s-triazolo[4,3-a]azepine (1.48 g., 0.005 mole) in dry dimethylformamide (25 ml.) was added potassium iodide (1.66 g., 0.01 mole) and diethylamine (10 ml.) under nitrogen. The mixture was stirred at ambient temperature for 1½ hr., mixed with water and extracted with chloroform. The chloroform was washed with water, dried over sodium sulfate and concentrated in vacuo. The residue was dissolved in methanol chloroform ethyl acetate decolorized with Darco and crystallized from methanol chloroform ethyl acetate Skelly B to give 0.455 g. (35%), of 3 - vinyl-9H-dibenzo[c,f]-s-triazolo[4,3-a]azepine, of melting point 186–187° (incomplete melt). The analytical sample had a melting point of 186–187° (incomplete melt).

*Anal.*

Calcd. for $C_{17}H_{13}N_3$: C, 78.74; H, 5.05; N, 16.21.
Found: C, 79.52; H, 5.30; N, 15.99.

*Example 59.*—9,9-Dimethyl-9H-dibenzo[c,f]-s-triazolo[4,3-a]azepine

In the manner given in Example 1, 11,11-dimethyl-6(5H)-morphanthridinethione was condensed with formic acid hydrazide at about 200° C. to give 9,9-dimethyl-9H-dibenzo[c,f]-s-triazolo[4,3-a]azepine.

*Example 60.*—3-[(dimethylamino)methyl]-9,9-dimethyl-9H-dibenzo[c,f]-s-triazolo[4,3-a]azepine In the manner given in Example 45, 3-(chloromethyl)-9,9-dimethyl - 9H - dibenzo[c,f]-s-triazolo[4,3-a]azepine was reacted with sodium iodide and dimethylamine at ambient temperature to give 3-[(dimethylamino)methyl]-9,9-dimethyl-9H-dibenzo[c,f]-s-triazolo[4,3-a]azepine.

*Example 61.*—3,9,9-Trimethyl-9H-dibenzo[c,f]-s-triazoloazepine

A solution of 11,11-dimethyl-6(5H)-morphanthridine (5.0 g.; 0.02 moles) and acethydrazide (14.8 g., 0.2 mole) in 25 ml. of n-butanol was stirred at room temperature under nitrogen for 24 hours followed by heating at 80° C. for 20 hours. The solvent was removed in vacuo and the residue was crystallized from isopropanol to give 3.11 g. (56.6%) of 3,9,9-trimethyl-9H-dibenzo[c,f]-s-triazolo[4,3-a]azepine as isopropanol solvate, melting point 262–265°.

*Anal.*

Calcd. for $C_{18}H_{17}N_{13}\cdot 1/6 C_3H_8O$: C, 78.25; H, 6.20; N, 14.80.
Found: C, 78.26; H, 6.18; N, 14.47.

*Example 62.*—Dibenzo-[b,f]-s-triazolo[4,3-d][1,4]thiazepine

In the manner given in Example 1, dibenzo[b,f][1,4]thiazepine-11(10H)thione was condensed at about 200° C. with formic acid hydrazide to give dibenzo[b,f]-s-triazolo[4,3-d][1,4]thiazepine.

*Example 63.*—9,9-Dioxo-dibenzo[b,f]-s-triazolo[4,3-d][1,4]thiazepine

Dibenzo[b,f]-s-triazolo[4,3-d][1,4]thiazepine was dissolved in chloroform-methanol (1:1) on a steam bath and cooled to room temperature. Meta-chloroperbenzoic acid was added to this and the reaction stirred overnight. Extraction of the solution gave 9,9 - dioxo-dibenzo[b,f]-s-triazolo[4,3-d][1,4]thiazepine.

*Example 64.*—3-methyl-dibenzo[b,f]-s-triazolo[4,3-d][1,4]thiazepine

In the manner given in Example 1, dibenzo[b,f][1,4]thiazepine-11(10H)thione was condensed at about 200° C. with acetic acid hydrazide to give 3-methyl dibenzo[b,f]-s-triazolo[4,3-d][1,4]thiazepine.

*Example 65.*—3-methyl-9,9-dioxo-dibenzo[b,f]-s-triazolo[4,3-d][1,4]thiazepine

In the manner given in Example 63, 3-methyl-dibenzo[b,f]-s-triazolo[4,3-d][1,4]thiazepine and meta-chloroperbenzoic acid were reacted to give 3-methyl-9,9-dioxo-dibenzo[b,f]-s-triazolo[4,3-d][1,4]thiazepine.

In the manner illustrated by the beforegoing examples, other compounds of formulae II and III can be synthesized. Representative compounds of formulae II and III, thus prepared, include:

6-fluoro-9,9-diethyl-9H-dibenzo[c,f]-s-triazolo[4,3-a]azepine;
3-hydroxymethyl-9,9-dimethyl-9H-dibenzo[c,f]-s-triazolo[4,3-a]azepine;
7,11-difluoro-9,9-dipropyl-3-cyanomethyl-9H-dibenzo[c,f]-s-triazolo[4,3-a]azepine;
3-hydroxymethyl-9H-dibenzo[c,f]-s-triazolo[4,3-a]azepine;
6,12-difluoro-3-bromo-9H-dibenzo[c,f]-s-triazolo[4,3-a]azepine;
6,12-difluoro-3-(3-morpholinopropyl)-9H-dibenzo[c,f]-s-triazolo[4,3-a][1,4]azepine;
6,11-diiodo-3,9-diethyl-9H-dibenzo[c,f]-s-triazolo[4,3-a]azepine;
7-ethylsulfonyl-13-methylthio-3,9-diethyl-9H-dibenzo[c,f]-s-triazolo[4,3-a]azepine;
11-methyl-5-methylthio-3-propyl-9H-dibenzo[c,f]-s-triazolo[4,3-a]azepine;
10-isopropyl-7-iodo-3-chloromethyl-9H-dibenzo[c,f]-s-triazolo[4,3-a]azepine;
7,12-diethoxy-2-[2-(dimethylamino)ethyl]-9H-dibenzo[c,f]-s-triazolo[4,3-a]azepine;
3-hydroxymethyl-7-chloro-9H-dibenzo[c,f]-s-triazolo[4,3-a]azepine;
7,11-difluoro-3,9-bis[(dimethylamino)methyl]-9H-dibenzo[b,f]-s-triazolo[4,3-d][1,4]diazepine;
6,12-dichloro-3-bromo-9H-dibenzo[b,f]-s-triazolo[4,3-d][1,4]diazepine;
6,12-dibromo-3-ethyl-9-[2-(dipropylamino)ethyl]-9H-dibenzo[b,f]-s-triazolo[4,3-d][1,4]diazepine;
6,12-dichloro-3-chloromethyl-9H-dibenzo[b,f]-s-triazolo[4,3-d][1,4]oxazepine;
6,12-dichloro-3-[2-(diethylamino)ethyl]-9H-dibenzo[b,f]-s-triazolo[4,3-d][1,4]thiazepine;
6,12-diisopropoxy-3-methyl-9-ethyl-9H-dibenzo[b,f]-s-triazolo[4,3-d][1,4]diazepine;
10-formamido-6-methyl-9H-dibenzo[b,f]-s-triazolo[4,3-d][1,4]diazepine;
7,10-diamino-3,9-dipropyl-9H-dibenzo[b,f]-s-triazolo[4,3-d][1,4]diazepine;
11-dipropylamino-7-iodo-3-isopropyl-9H-dibenzo[b,f]-s-triazolo[4,3-d][1,4]diazepine;
13-iodo-3-(2-pyrrolidino)ethyl-9H-dibenzo[b,f]-s-triazolo[4,3-d][1,4]diazepine;
8-amino-3-[2-(1-methyl-2-piperidinyl)ethyl]-9H-dibenzo[b,f]-s-triazolo[4,3-d][1,4]diazepine;
11-isopropyl-3-(3-morpholinopropyl)-9H-dibenzo[b,f]-s-triazolo[4,3-d][1,4]diazepine;
12-chloro-3,9-bis(morpholinomethyl)-9H-dibenzo[b,f]-s-triazolo[4,3-d][1,4]diazepine;
11-bromo-3,9-dimethyl-9H-dibenzo[b,f]-s-triazolo[4,3-d][1,4]diazepine;
3-hyroxymethyl-9H-dibenzo[b,f]-s-triazolo[4,3-d][1,4]diazepine;
3-hydroxymethyl-9-[2-(dimethylamino)ethyl]-9H-dibenzo[b,f]-s-triazolo[4,3-d][1,4]diazepine;
3-hydroxymethyl-7-chloro-9H-dibenzo[b,f]-s-triazolo[4,3-d][1,4]diazepine;
11-bromo-3-ethyldibenzo[b,f]-s-triazolo[4,3-d][1,4]thiazepine;
3-(3-morpholinopropyl)dibenzo[b,f]-s-triazolo[4,3-d][1,4]thiazepine;
12-propoxy-3-(2-piperidinoethyl)dibenzo[b,f]-s-triazolo[4,3-d][1,4]thiazepine;
13-fluoro-8-iodo-3-(pyrrolidinomethyl)dibenzo[b,f]-s-triazolo[4,3-d][1,4]thiazepine;
6-methoxy-3-[2-(4-methylpiperazino)ethyl]dibenzo[b,f]-s-triazolo[4,3-d][1,4]thiazepine;
7,12-di(methylsulfonyl)-3-(methyl)dibenzo[b,f]-s-triazolo[4,3-d][1,4]thiazepine;
6-ethylthio-11-propylsulfinyl-3-[2-(dimethylamino)ethyl]dibenzo[b,f]-s-triazolo[4,3-d][1,4-]thiazepine;
10-iodo-3-(bromo)dibenzo[b,f]-s-triazolo[4,3-d][1,4]thiazepine;
6-(dimethylamino)-3-(chloromethyl)dibenzo[b,f]-s-triazolo[4,3-d][1,4]thiazepine;
3-hydroxymethyl-dibenzo[b,f]-s-triazolo[4,3-d][1,4]thiazepine;
3-hydroxymethyl-7-chloro-dibenzo[b,f]-s-triazolo[4,3-d][1,4]thiazepine;

3-hydroxymethyl-dibenzo[b,f]-s-triazolo[4,3-d][1,4]oxazepine;
3-hydroxymethyl-7-chloro-dibenzo[b,f]-s-triazolo[4,3-d][1,4]oxazepine;
10-iodo-3-[3-(dipropylamino)propyl]-dibenzo[b,f,]-s-triazolo[4,3-d][1,4]oxazepine;
8-amino-12-fluoro-3-(bromo)dibenzo[b,f]-s-triazolo[4,3-d][1,4]oxazepine;
12-chloro-3-(propyl)dibenzo[b,f]-s-triazolo[4,3-d][1,4]oxazepine;
7,11-difluoro-3-(3-morpholinopropyl)dibenzo[b,f]-s-triazolo[4,3-d][1,4]oxazepine;
11-propyl-3-[2-(4-ethylpiperazino)ethyl]dibenzo[b,f,]-s-triazolo[4,3-d][1,4]oxazepine;
8,12-dimethoxy-3-(3-piperidinopropyl)dibenzo[b,f]-s-triazolo[4,3-d][1,4]oxazepine;
7-fluoro-12-propyl-3-(chloromethyl)dibenzo[b,f]-s-triazolo[4,3-d][1,4]oxazepine;
13-methylthio-3- chloromethyl)dibenzo[b,f]-s-triazolo[4,3-d][1,4]oxazepine;
5-dimethylamino-3-(isopropyl)dibenzo[b,f]-s-triazolo[4,3-d][1,4]oxazepine;
8,12-bis(ethylsulfonyl)-3-(methyl)dibenzo[b,f]-s-triazolo[4,3-d][1,4]oxazepine;

and the like.

Treating the compounds of formulae II and III with a pharmacologically acceptable acid such as hydrochloric, hydrobromic, phosphoric, sulfuric, acetic, propionic, toluenesulfonic, methanesulfonic, tartaric, citric, lactic, malic, maleic, cyclohexanesulfamic acids, and the like or a peracid produces the pharmacologically acceptable salts or N-oxides of these compounds of formula II or III which can be used like the free base compounds of formula II or III. Salt formation is achieved in conventional manner by reacting the compounds of formula II or III with excess of a selected acid in a suitable medium e.g. water, a lower alkanol, ether, or acetone and recovering the salt by evaporating the solvent, preferably in vacuo. The N-oxides are prepared by reacting the compounds of formula II or III with an excess of a peracid such as perbenzoic acid, perphthalic acid, or m-chloroperbenzoic acid, in a solvent such as a lower alkanol, chloroform, or methylene chloride and recovering the N-oxide by evaporating the solvent in vacuo.

We claim:
1. 3 - (2 - pyridyl)-9H-dibenzo[c,f]-s-triazolo[4,3-a]azepine.
2. 3 - (3 - pyridyl)-9H-dibenzo[c,f]-s-triazolo[4,3-a]azepine.
3. 3 - (4 - pyridyl)-9H-dibenzo[c,f]-s-triazolo[4,3-a]azepine.

References Cited
UNITED STATES PATENTS
3,711,489   1/1973   Lombardino _____ 260—296 P ALAN L. ROTMAN, Primary Examiner U.S. Cl. X.R.

260—294.8 A, 294.9, 295 A, 295.5 P, 247.1, 247.5 R, 268 PC, 293.59, 308 R, 239 T, 247.2 A; 424—248, 250, 263, 266, 267, 269

UNITED STATES PATENT OFFICE
CERTIFICATE OF CORRECTION

Patent No. 3,850,942          Dated November 26, 1974

Inventor(s) Jackson B. Hester, Jr. and Jacob Szmuszkovicz

It is certified that error appears in the above-identified patent and that said Letters Patent are hereby corrected as shown below:

Column 3, lines 50-55, "$-C\equiv C-C-N\begin{smallmatrix}H&R_7\\&\\H&R_7\end{smallmatrix}$" should read -- $-C\equiv C-C-N\begin{smallmatrix}H&R_7\\&\\H&R_8\end{smallmatrix}$ --.

Column 10, line 50, "[1-4]" should read -- [1,4] --; line 70, "trizolo" should read -- triazolo --. Column 11, line 39, "chlorodizenbo" should read -- chlorodibenzo --. Column 12, line 31, "[4,3-d]diazepine" should read -- [4,3-d][1,4]diazepine --; line 34, "9H dibenzo" should read -- 9H-dibenzo --. Column 13, line 45, "amino)" should read -- aminoethyl) --; line 55, "9H-dibenzo-triazolo" should read -- 9H-dibenzo[b,f]-s-triazolo --; line 56, "[4,3-d]diazepine" should read -- [4,3-d][1,4]diazepine -- Column 14, line 73, "9-H-" should read -- -9H- --. Column 15, line 40, "N, 22.0" should read -- N, 22.06 --. Column 16, line 13, "[1,4-" should read -- [1,4] --. Column 17, line 22, "[4,3]" should read -- [4,3-d] --; line 36, "(dimethylaminopropyl]" should read -- (dimethylamino)propyl] --; line 68, "triazol" should read -- triazolo --. Column 19, line 1, "solution (under" should read -- solution) under --. Column 21, line 64, "[3-Di" should read -- [3-(Di --; line 70, "(10 ml.) of " should read -- (10 ml. of --. Column 22, line 3, "69% of" should read -- 69%) of --; line 3, "3-[3-di" should read -- 3-[3-(di --; line 12, "3-[-Di" should read -- 3-[3-(Di --; line 36, "3-(Pyrrol" should read -- 3-(3-Pyrrol --. Column 24, line 15, "-2-[2-" should read -- -3-[2- --. Column 25, line 19, "-3-chloro" should read -- -3-(chloro --.

Signed and Sealed this

Seventh Day of September 1976

[SEAL]

Attest:

RUTH C. MASON
*Attesting Officer*

C. MARSHALL DANN
*Commissioner of Patents and Trademarks*